US006686596B2

(12) United States Patent
Woodburn et al.

(10) Patent No.: US 6,686,596 B2
(45) Date of Patent: Feb. 3, 2004

(54) SYSTEM AND METHOD OF IRRADIATING PRODUCTS BEING CONVEYED PAST AN ELECTRON BEAM DELIVERY DEVICE

(75) Inventors: David Woodburn, Caterham (GB); Walter Crewson, Ridgefield, CT (US)

(73) Assignee: ScandiNova AB, Stockholm (SE)

( * ) Notice: Subject to any disclaimer, the term of this patent is extended or adjusted under 35 U.S.C. 154(b) by 0 days.

(21) Appl. No.: 10/078,661

(22) Filed: Feb. 21, 2002

(65) Prior Publication Data

US 2003/0155526 A1 Aug. 21, 2003

(51) Int. Cl.[7] .................................................. G01N 23/00

(52) U.S. Cl. .............................. 250/453.11; 250/454.11; 250/455.11

(58) Field of Search ........................ 250/453.11, 454.11, 250/455.11

(56) References Cited

U.S. PATENT DOCUMENTS

| | | | | |
|---|---|---|---|---|
| 6,191,424 B1 | * | 2/2001 | Stirling et al. ......... | 250/455.11 |
| 6,459,089 B1 | * | 10/2002 | Masefield et al. ..... | 250/453.11 |

* cited by examiner

*Primary Examiner*—John R. Lee
*Assistant Examiner*—James P. Hughes
(74) *Attorney, Agent, or Firm*—Bacon & Thomas, PLLC

(57) ABSTRACT

A beam handling system that switches between two beam distribution systems (irradiation areas). When the first product has passed the beam, the second product starts to be irradiated in the second beam. This may be the same beam but directed in a different direction, or two separate beams, and the switching of direction is synchronized to occur as one product irradiation is completed and the second comes into position.

18 Claims, 7 Drawing Sheets

SYSTEM AND METHOD OF IRRADIATING PRODUCTS BEING CONVEYED PAST AN ELECTRON BEAM DELIVERY DEVICE

BACKGROUND OF THE INVENTION

1. Field of the Invention

This invention relates in general to conveyor systems, and in particular to conveyor systems used to transport products past an electron beam (e-beam) delivery device. The invention also relates to methods of irradiating products as they are conveyed past an electron beam delivery device.

According to the invention:

(a) products to be irradiated are caused to travel along a path that passes through at least two different beam delivery positions; and (b) the electron beam is switched between the two delivery positions in synchronism with passage of products past the respective beam delivery positions such that when a product at the first position has been irradiated, the beam switches to the second position and begins irradiating a second product, thereby eliminating radiation of space between the products without the necessity of turning the beam on and off.

2. Description of Related Art

In industrial applications where a large set of products is to be irradiated, it is conventional to place the products to be irradiated into boxes or trays. The boxes or trays are then placed on a conveyor that carries them through the shielding of the delivery system and into the irradiation area.

The problem with such systems is that they are inefficient because much of the radiation from the e-beam delivery device passes between the trays and, if the trays are not completely filled, into empty spaces in the boxes. To compensate for this inefficiency, e-beam manufacturers have simply designed bigger and bigger systems with very high beam power. The cost of accelerating electrons for use in irradiating products is not insignificant, and thus considerable savings could be obtained if the electrons were utilized more efficiently.

The most inefficient e-beam delivery systems are those having a fixed scan width. In that case, the entire area between the sides of the products and the sides of the electron beam are wasted, as illustrated in FIG. 1.

A partial solution to the efficiency problem is to adjust the beam width. However, while use of adjustable beams permits waste to be reduced in a direction transverse to the travel direction, conventional adjustable beam devices do not compensate for radiation lost to the spaces between products in the direction of travel, as illustrated in FIG. 2. Even if successive trays touch each other, the amount of space between the products could still be as much as 49% of the length of the trays since if a product occupies 51% or more of the container length, it is impossible to place two of those products in the container in order to fill-up the remaining space. If the trays do not touch, then the amount of wasted space will be even greater. As a result, control of the beam width alone cannot solve the problem of radiation lost to spaces around the product.

Additional reductions in radiation losses can also be obtained by reducing the spaces between products. However, the amount by which the spaces can be reduced in current conveyance or product handling systems is limited, at least in the product handling systems currently available, which are basically of two types. The first type of conventional conveyance system simply takes no account of partially filled product containers or spacing between product containers. FIG. 4 represents a simple conveyor which is commonly used, and in which the product containers are joined by a chain. The spacing in between the containers is needed to allow corners to be managed when the series of trays is winding its way through the irradiation protection surrounding the beam area. As is apparent in FIG. 4, much of the beam is lost in between the product containers, which is a significant disadvantage since it lowers the overall efficiency of the machine.

Advanced types of conventional conveyor, on the other hand, overcome the problem of spacing in between product containers with advanced mechanics. FIG. 5 shows an advanced conveyor type currently available in the market, in which complex mechanics is used to stack the product containers close to each other and thus get higher effective use of the available beam. After the products have been irradiated, the containers are separated to enable them to manage the corners in the irradiation protection. However, even the advanced conveyor type cannot solve the problem of lost beam due to incompletely filled product containers. There is no known conveyor available in the market which compensates for this.

Aside from adjusting the beam width and providing conveyance arrangements that minimize spacing between products, another potential solution to the efficiency problem would be to switch an adjustable scan-width beam on and off so that the beam is turned on when the product is within the beam coverage area, and off when the product is outside the beam coverage area. While such a system could in theory result in the coverage illustrated in FIG. 3, the system would have the inherent disadvantage that the electron beam delivery device would have to wait for the each product to arrive at the beam delivery position before being turned on, resulting in low production capacity.

In addition to the above-described limitations, the design of any conveyor system intended to be used in a high radiation environment such as an electron beam delivery device, and in particular systems that are relatively complex, must take into account a variety of additional limitations. Among other difficulties, the high radiation precludes the use of magnetic materials and organic materials such as plastics and lubricants, which are found in many electronic and mechanical components of conveyor systems used in other contexts, and furthermore prevents placement of electronics such as sensors and integrated circuits in the beam delivery area, without substantial shielding. In addition, the need to provide shielding to protect persons and electronics situated outside the beam delivery device further limits the size and number of components that can be included, since the larger the beam delivery device, the more shielding that is required. In addition, radiation creates ozone gas, which presents a hazard to operators, increasing the desirability of the making the system as maintenance free as possible. Finally, it is critical in any conveyor system that a consistent speed of products past the beam delivery device be maintained, and that no shadows are present, to ensure uniform irradiation of each product.

SUMMARY OF THE INVENTION

It is accordingly a first objective of the present invention to provide a system for conveying products past an electron beam delivery device, in which the electron beam delivery device irradiates only the products, and not the space around the products, in a simple and robust manner.

It is a second objective of the invention to provide a beam delivery and product conveyor system that provides the optimal coverage of a system in which the beam is turned on and off as products go past, and yet in which production capacity is increased by eliminating the need to wait for each product to reach the beam delivery device before turning on the beam.

It is a third objective of the invention to provide an electron beam delivery system in which the electron beam delivery is synchronized to the presence of products in the coverage area of the beam, and yet that does not require complex control electronics.

It is a fourth objective of the invention to provide a simple and robust conveyor system for conveying products past an electron beam delivery device that optimizes beam coverage for a variety of different product configurations while minimizing wasted radiation and maximizing processing speed.

It is a fifth an objective of the invention to provide a simple and robust conveyor device which reduces lost radiation due to spacing in between product containers and that, in one embodiment, is also capable of taking into account incompletely filled containers.

It is a sixth objective of the invention to provide a system for minimizing lost radiation during movement of products past an electron beam delivery device, and yet that can be applied to different types of mechanical conveyors, including conveyors in which individual containers are chained together, and conveyors that use separate trays to hold the products, thus permitting the designer to select between the advantages of each type of system.

To achieve these objectives, the invention provides a beam handling system that switches the beam between at least two irradiation areas at a predetermined rate synchronized to the speed of the conveyor, so that when radiation of a first product is completed, the beam can begin irradiating a second product without having to switch the beam on and off. This switching between two beam positions is to be distinguished from a system that merely controls beam duration by turning the beam on and off, or that seek to control product position relative to the beam.

According two alternative preferred embodiments of the invention, the beam position switching may be carried out either (a) by providing two beam delivery devices and turning one beam on while the other is turned off, or (b) by moving a single continuous beam from one area to the other. In addition, further compensation for product placement may be achieved by adjusting the spacing between trays without having to adjust the timing at which the beam is switched, and/or conveyor speed.

If the conveyor to which the invention is applied is a chain conveyor, in which the chain drags the products through the lead shielding, the invention is implemented by simply switching the electron beam between the two positions. By switching the beam between two different positions a higher usage of the beam is achieved as there will always be a product container beneath one of the two possible beam locations. With this type of conveyor, one can combine the best properties from the two different conveyor systems available in the market today, resulting in a relatively inexpensive, simple, and redundant conveyor with the possibility of compensating for the space in between conveyor trays.

The benefits of applying beam position switching to a chain conveyor can be summarized as follows:

- good speed and position control of the product through the irradiation zone,
- the possibility of a small footprint,
- the conveyor system is cheap, although the chain conveyor has the disadvantage that the conveyor still cannot completely compensate for trays that are not filled or for different tray sizes.

If, on the other hand, the invention is applied to a conveyor that utilizes non-chained individual containers that are pushed along, the advantage is obtained that the speed and position of the containers may be individually synchronized to get an optimal irradiation based on the fill rate of the product containers. In such a system, the beam is again switched between two different positions, but in synchronism with individually adjusted container speeds and positions, resulting in a conveyor that not only compensates for the spacing in between the product containers, but also compensates for incompletely filled containers, resulting in nearly 100% usage of the available beam power. The movement of the trays may be operated in this implementation from electrical motors outside the irradiation shielding, with power transmission by means of shafts running through the lead shielding.

The benefits of individually pushed containers can be summarized as:

- the possibility of adjusting for incompletely filled trays, and
- the possibility of easily changing product containers for different types of product, although this type of conveyor is more expensive and has many more moving parts that the chain conveyor, requires an advanced speed/position control system, and is likely to have a larger footprint.

In summary, the present invention makes it possible to have an even dose distribution on the product regardless of size and fill rate of the product container and still have a nearly 100% use of the available beam energy. The dose could be delivered in many positions from one or many directions according to the product. The system is also easily adaptable to different product sizes, without the need of changing the product container size/model.

DETAILED DESCRIPTION OF THE PREFERRED EMBODIMENTS

Below follows a detailed description of the invention. The invention will be described by way of a preferred embodiment but the embodiment should not be seen as a limitation of the invention, which is defined by the appended claims.

Figure 1:
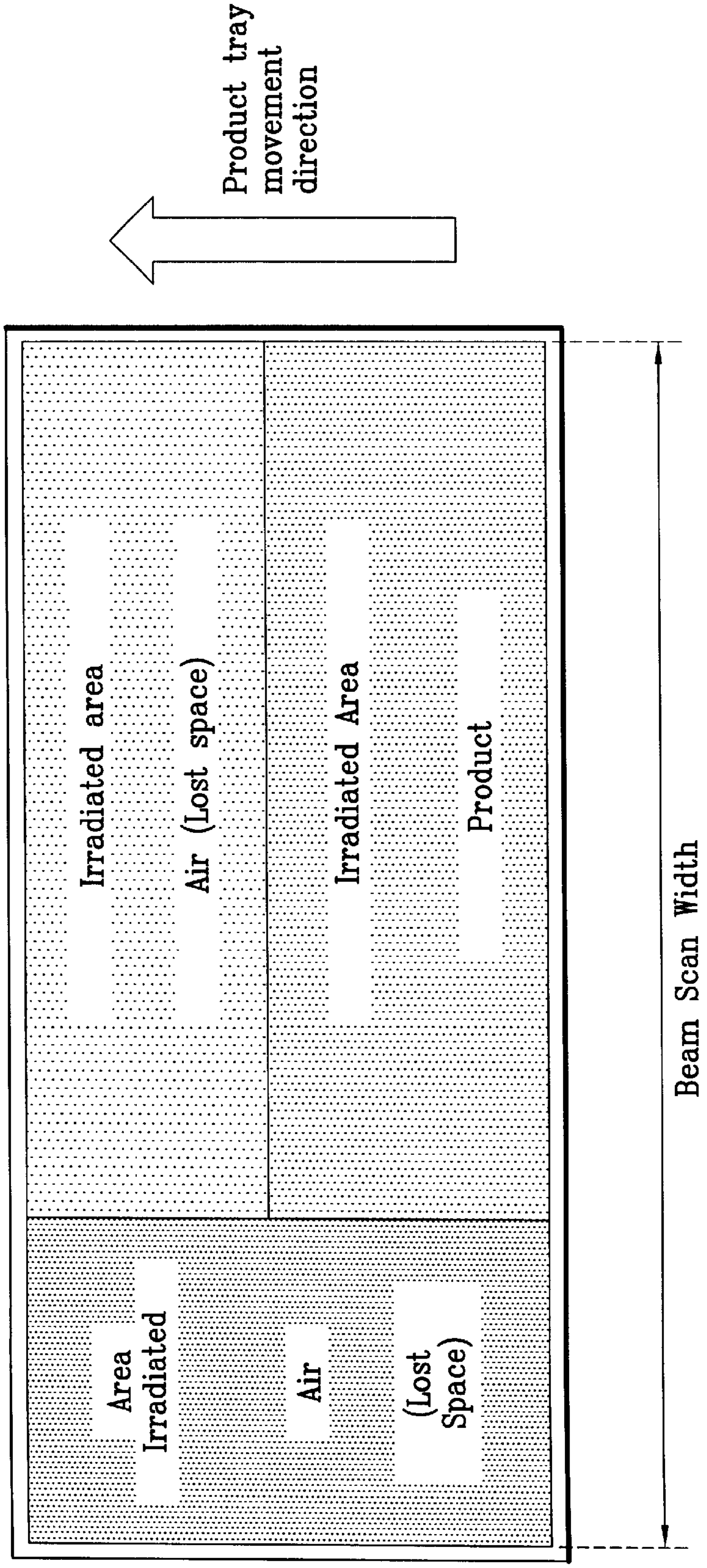
FIG. 1 (Prior Art)
FIG. 1 is a schematic view that illustrates how parts of the radiation are lost during irradiation, using a fixed scan width and a fixed distance between the products, according to prior art.
Figure 2:
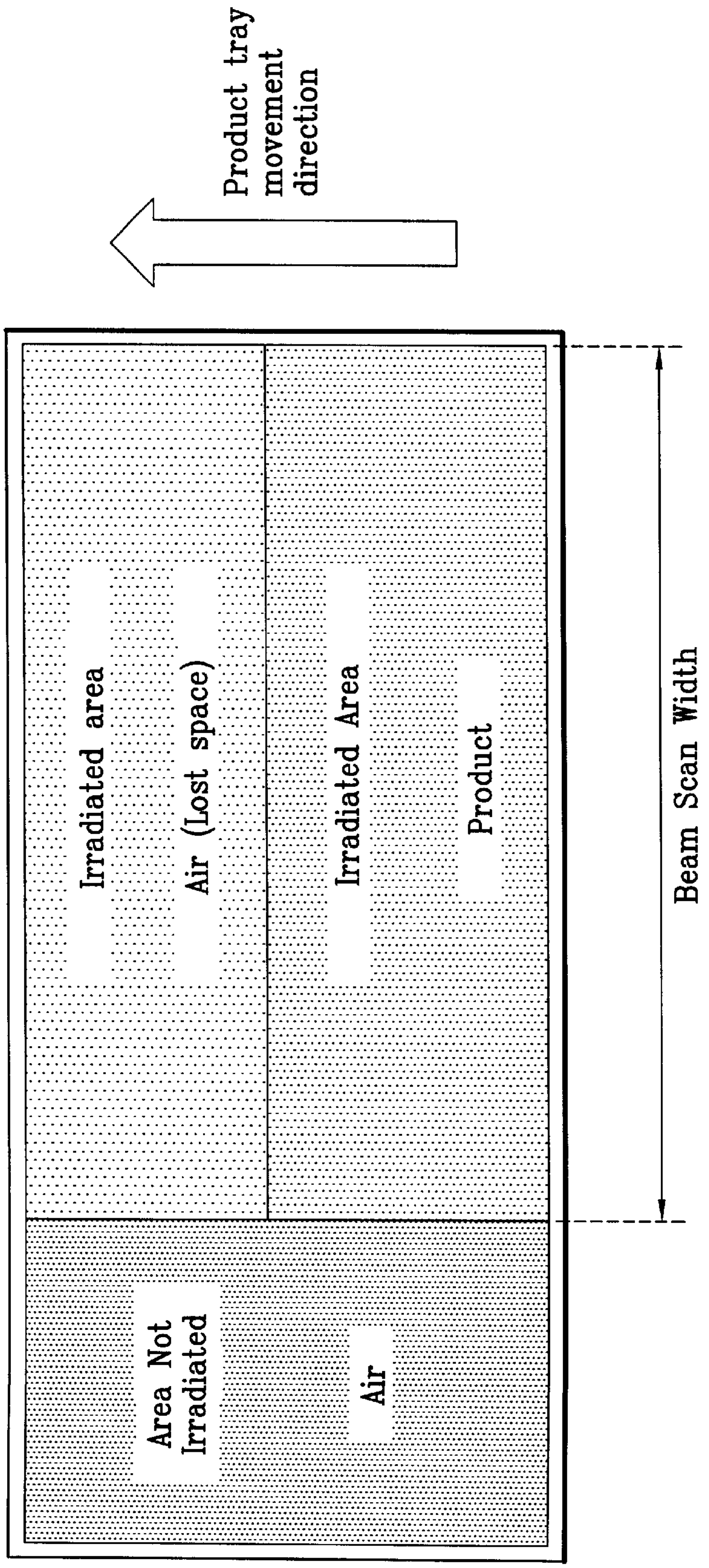
FIG. 2 (Prior Art)
FIG. 2 is a view that illustrates how parts of the radiation are lost during irradiation, using an adjustable scan width feature of products according to prior art.
Figure 3:
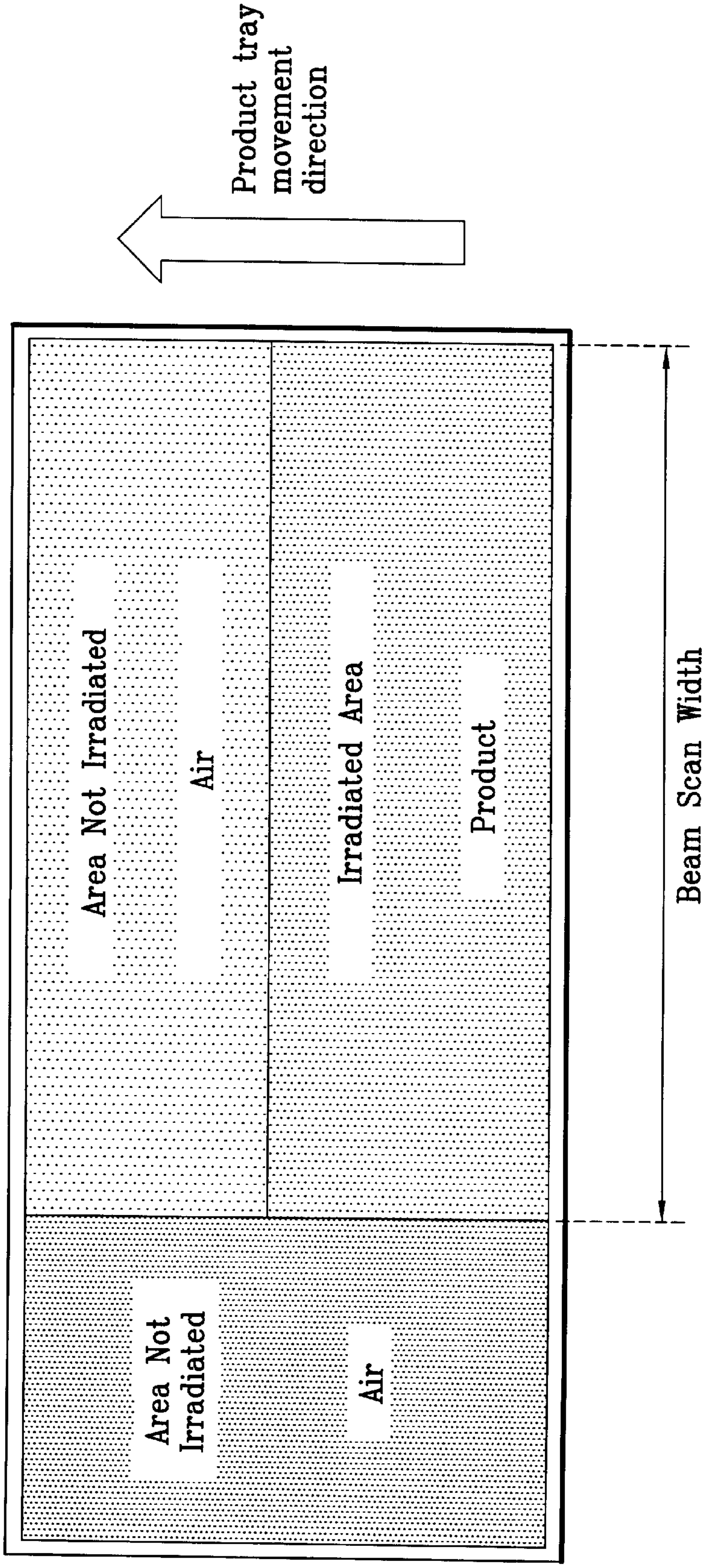
FIG. 3 (Prior Art)
FIG. 3 is a schematic view that illustrates how no space around the product is wasted if the products are irradiated when an adjustable scan width and synchronization between the product and the beam is used.
Figure 4:
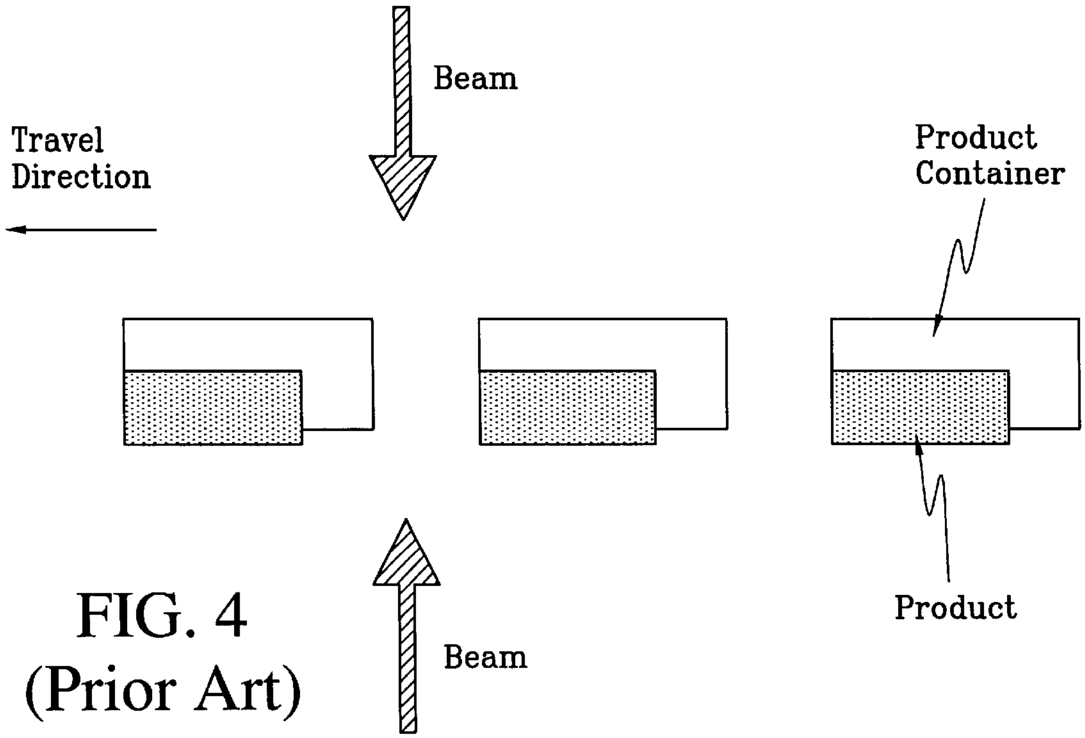
FIG. 4 (Prior Art)
FIG. 4 is a schematic view of a simple conveyor type commonly used in the prior art.
Figure 5:
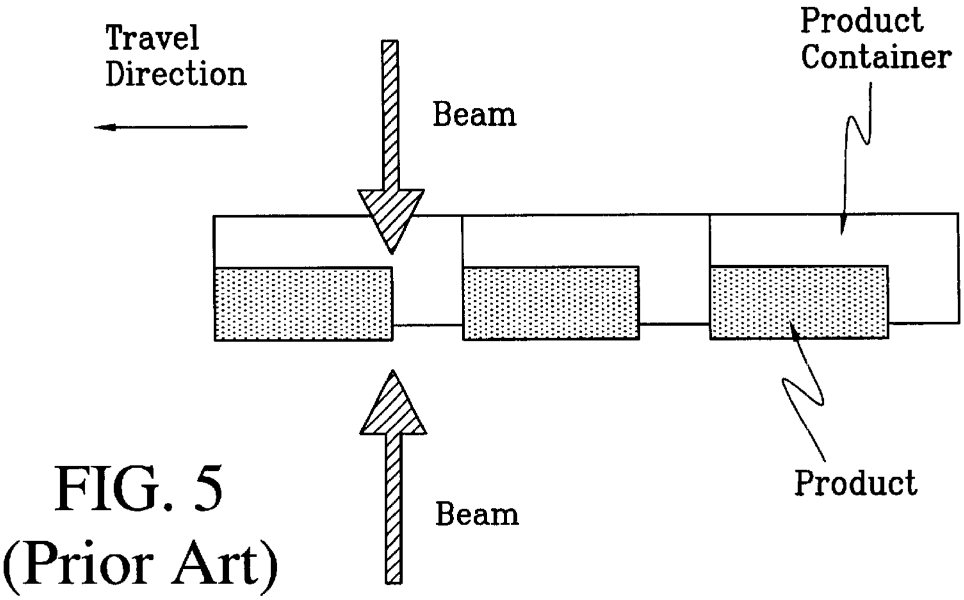
FIG. 5 (Prior Art)
FIG. 5 is a schematic view of an advanced conveyor type commonly used in prior art
Figure 6:
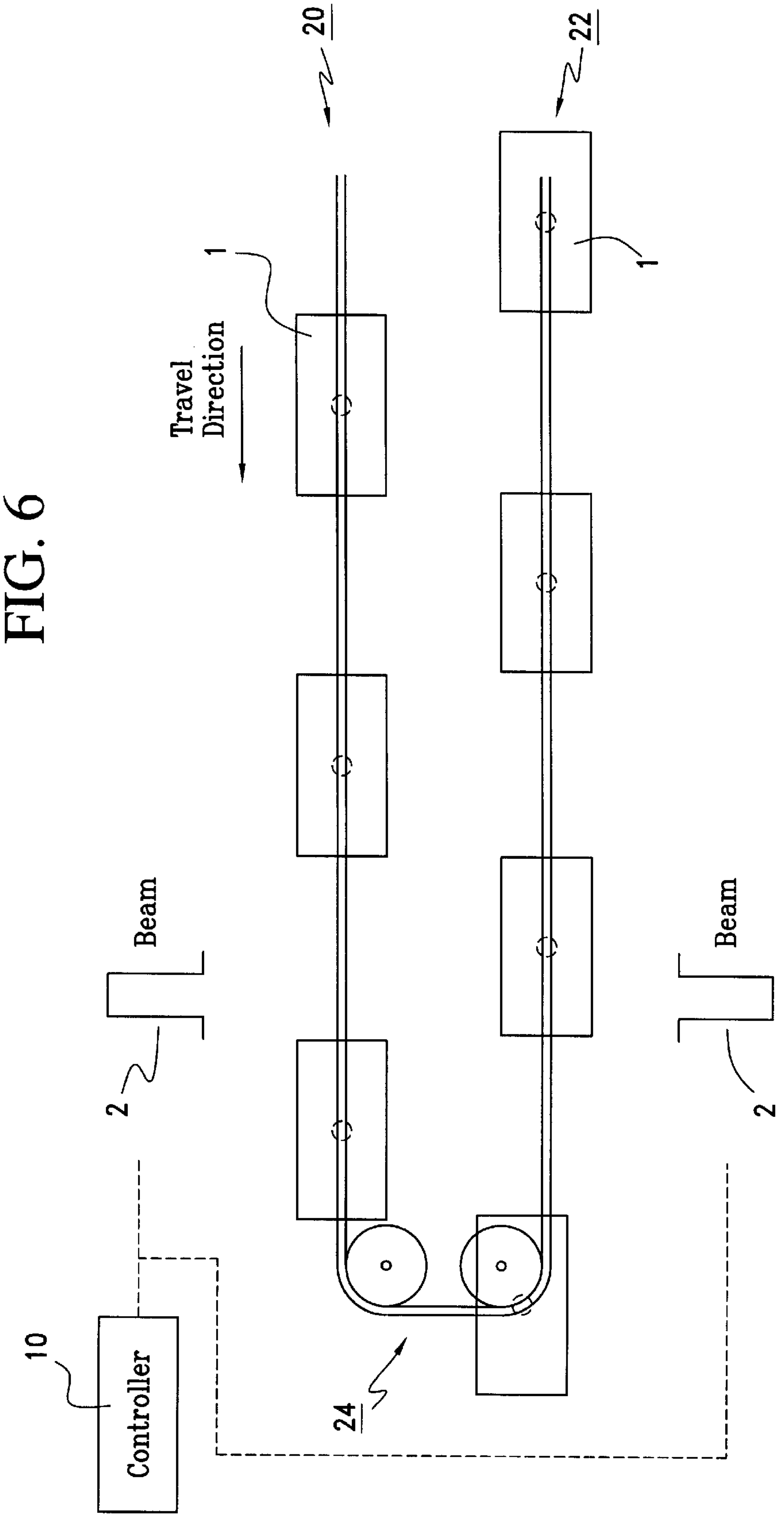
FIG. 6 is a schematic side view of a conveyor implemented according to the principles of a preferred embodiment of the invention.
Figure 8:
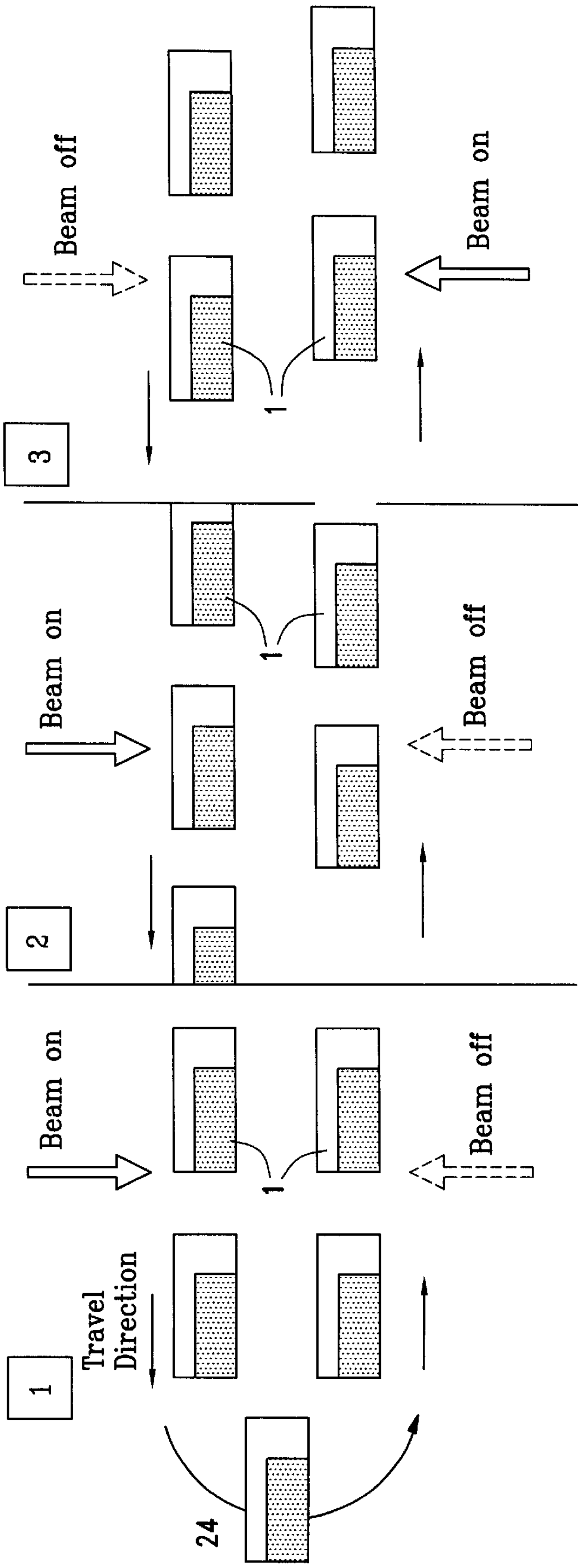
FIG. 8 is a schematic plan view illustrating the operation of a conveyor system similar to the one shown in FIG. 6.

As illustrated in FIG. 6, a plurality of containers (1) are transported along a path that is moving relative to the beam delivery device such that products in the containers can be irradiated by the beams. The full path that they are moving along comprises, in the embodiment of FIGS. 6 and 8, a container input path (20), a container output path (22) and a U-turn (24) around the beam delivery device symbolically represented by two pulses and designated as reference numeral (2). The beam delivery device can consist either of a single beam delivery device in which the position of the beam can be changed from position A to position B, or it can consist of two synchronously connected devices arranged to turn on alternately as products pass the devices. A beam switching controller 10 is provided to control switching between position A and B, although controller (10) may of course be part of a general purpose computer or controller rather than a separate unit. In addition, a synchronization means, which may include a speed controller (12), is provided to synchronize beam switching and product speeds and positions.

According to the principles of this embodiment of the invention, a container (1) with a product follows the container input path (20) into the irradiation zone. The product preferably traverses the irradiation zone at a constant speed to ensure a homogenous dose over the whole surface, and is irradiated here as long as it is in the predetermined irradiation zone. When the product leaves the irradiation zone, the delivery device, through computer controlled means, switches sides and irradiates the container on the opposite side, i.e. the output path (22). The speed of the products is such that when the switching of sides take place, a container with another product is entering the irradiating zone on the new side, where it is irradiated as long as it is in the predetermined irradiation zone. When the new product leaves, the delivery device switches sides yet again and yet another product is synchronized to enter on the other side. By proceeding in this manner and switching sides for the beam delivery it is possible to achieve an optimal utilization of the beams without having to turn-off the delivery device between the irradiating of consecutive products.

The switching can of course be synchronized in such a manner that part of the product is irradiated on the input side of the path, and other parts of the product are irradiated on the output path. Again, this is achieved through synchronization between the container speed and the switching of the beam delivery system. In this way, one achieves a unitary irradiation of the products. It is also possible to irradiate both sides of a product if there is some means to turn the container, or the product in the container, somewhere along the path between the two different irradiation locations. As was mentioned earlier the switching of sides for the beam delivery system is achieved through computer controlled means, the synchronization of the container speed with this switching preferably being achieved through mechanically adjustable means that can be set to increase or decrease the speed of the containers along some parts of the path if necessary.

Figure 7:
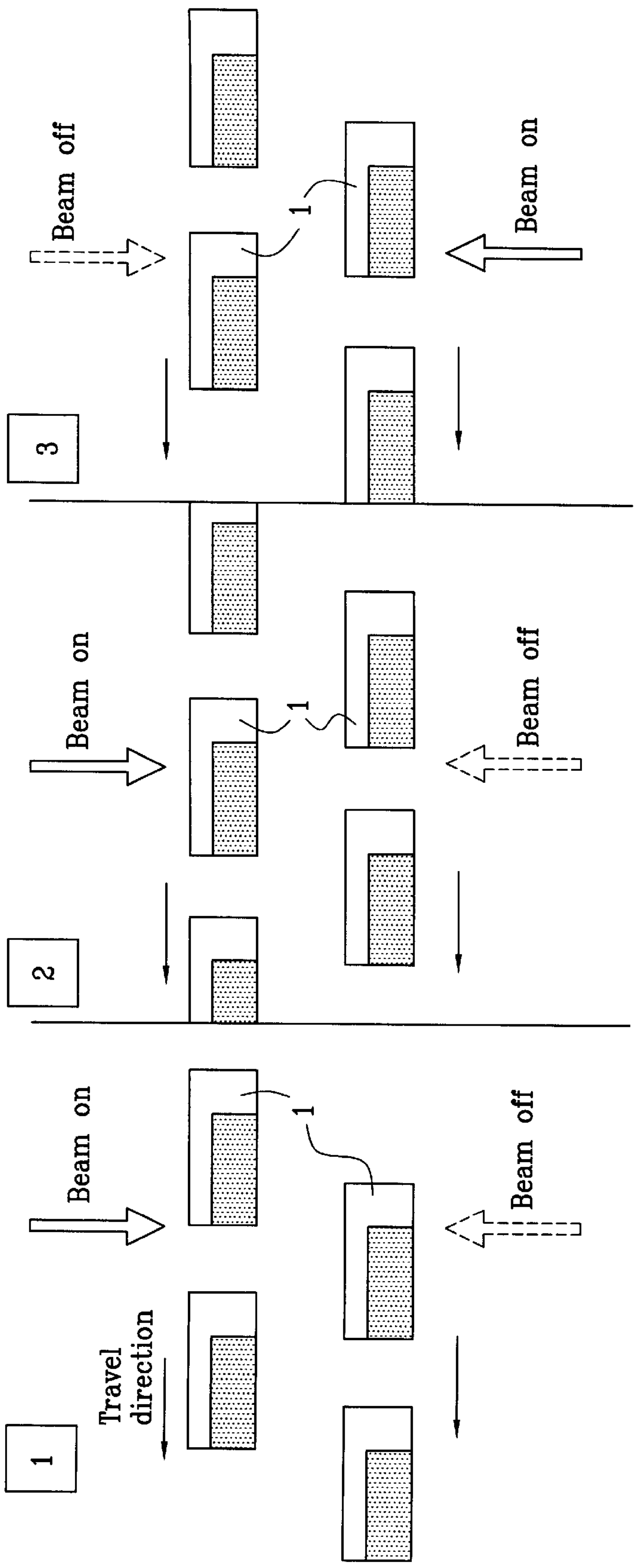
FIG. 7 is a schematic side view of a variation of the embodiment of FIG. 6, in which the products are moved in parallel through respective beam delivery areas.

Those skilled in the art will appreciate that the principles of the invention can be applied to a conveyor in which the products do not follow a curved path (that is the U-turn part of the full path), and the beam delivery system does not give irradiation on an input path and an opposite output path. Instead, as illustrated in FIG. 7, it is possible to have a container path following for example a straight line and having a series of beam delivery systems along this line. One can synchronize the different beam delivery systems so that a switching between them, synchronized with the product positions, give the same effect as a switching of beam delivery directions from a single beam delivery system.

In the example given earlier, the product is irradiated from a continuous beam delivered from two different positions, i.e., the former from above and the later from below. It can be seen from FIGS. 6-8 that by adjusting the spacing between the product containers together with the beam switching between two different positions the utilization of the beam can be made close to 100% even if the product containers are not completely filled. The adjustment of the system could also be made by varying the distance between the containers, or by varying the speed of forward travel or a combination of both. In addition, it is also be possible to automate this process so that the position of the containers is governed by the position of the product within the tray or box.

In summary, the present invention makes it possible to have an even dose distribution on the product regardless of size and fill rate of the product container and still have a nearly 100% use of the available beam energy. The dose could be delivered in many positions from one or many directions according to the product. The system is also easily adaptable to different product sizes, without the need of changing the product container size/model.

Having thus described a preferred embodiment of the invention in sufficient detail to enable those skilled in the art to make and use the invention, it will nevertheless be appreciated that numerous variations and modifications of the illustrated embodiment may be made without departing from the spirit of the invention, and it is intended that the invention not be limited by the above description or accompanying drawings, but that it be defined solely in accordance with the appended claims.

We claim:

1. A method for irradiating products with electron beams from at least one electron beam delivery device, each of said products being contained in a container moving along a path past said at least one electron beam delivery device, comprising the steps of:

controlling said at least one electron beam delivery device to switch beam delivery positions on said path, thereby irradiating at least two different locations on said path, and synchronizing the switching of the at least one beam delivery device between different beam delivery positions with positions and speeds at which products are conveyed along the path.

2. A method according to claim 1, wherein said at least one electron beam delivery device consists of one electron beam delivery device, said electron beam delivery device being controllable to switch beam directions to thereby irradiate said two different locations.

3. A method according to claim 1, wherein the step of synchronizing the beam delivery positions and the product positions and speeds is such that after a product has passed through the irradiation zone on a container input side of the beam delivery device, the beam delivery device is set to switch beam delivery direction and irradiate another product that has just entered an irradiation zone on the container output side of the beam delivery device; and such that after the product has been irradiated on the output side, the beam delivery device is set to switch direction again and a product that just has entered the irradiation zone on the input side is irradiated; and wherein the steps of switching from input side to output side and back continue for all products that are to be irradiated.

4. A method according to claim 1, wherein predetermined parts of the products are irradiated on a container input side of the path around the beam delivery device and other parts are irradiated on the container output side of the path around the beam delivery device.

5. A method according to claim 1, wherein the step of synchronizing product positions and speeds to the switching of the electron beam delivery positions is performed by adjustable mechanical means that speeds up and slows down said containers containing said products.

6. A method according to claim 1, wherein said at least one electron beam delivery device consists of two electron beam delivery devices, said devices being spaced apart.

7. A method according to claim 6, wherein the step of synchronizing the beam delivery positions and the product positions and speeds is such that after a product has passed through the irradiation zone on a container input side of the beam delivery device, the beam delivery device is set to switch from a first of said beam delivery devices to a second of said beam delivery devices and irradiate another product that has just entered an irradiation zone of the second beam delivery device; and such that after the respective product has been irradiated by the second beam delivery device, the beam delivery device is set to switch direction again and a product that just has entered the irradiation zone of the first beam delivery device is irradiated; and wherein the steps of switching between beam delivery devices continue for all products that are to be irradiated.

8. A method according to claim 7, wherein predetermined parts of the products are irradiated by the first beam delivery device and other parts are irradiated by the second beam delivery device.

9. A method according to claim 6, wherein said synchronization of the product positions and speeds to the switching of the electron beam delivery devices is performed by adjustable mechanical means that can speed up and slow down said containers containing said products.

10. A system for irradiating products with electron beams from at least one electron beam delivery device, each of said products being contained in a container moving along a path past said at least one electron beam delivery device, comprising:

means for controlling said at least one electron beam delivery device to switch beam delivery positions on said path, thereby irradiating at least two different locations on said path, and means for synchronizing the switching of the at least one beam delivery device between different beam delivery positions with positions and speeds at which products are conveyed along the path.

11. A system according to claim 10, wherein said at least one electron beam delivery device consists of one electron beam delivery device, said electron beam delivery device being controllable to switch beam directions to thereby irradiate said two different locations.

12. A system according to claim 10, wherein the synchronizing means is arranged such that after a product has passed through the irradiation zone on a container input side of the beam delivery device, the beam delivery device is set to switch beam delivery direction and irradiate another product that has just entered an irradiation zone on the container output side of the beam delivery device; and such that after the product has been irradiated on the output side, the beam delivery device is set to switch direction again and a product that just has entered the irradiation zone on the input side is irradiated; and wherein the switching from input side to output side and back continues for all products that are to be irradiated.

13. A system according to claim 12, wherein predetermined parts of the products are irradiated on a container input side of the path around the beam delivery device and other parts are irradiated on the container output side of the path around the beam delivery device.

14. A system according to claim 10, wherein the synchronizing means includes an adjustable mechanical means that speeds up and slows down said containers containing said products.

15. A system according to claim 10, wherein said at least one electron beam delivery device consists of two electron beam delivery devices, said devices being spaced apart.

16. A system according to claim 15, wherein the synchronizing means is arranged such that after a product has passed through the irradiation zone on a container input side of the beam delivery device, the beam delivery device is set to switch from a first of said beam delivery devices to a second of said beam delivery devices and irradiate another product that has just entered an irradiation zone of the second beam delivery device; and such that after the respective product has been irradiated by the second beam delivery device, the beam delivery device is set to switch devices again and a product that just has entered the irradiation zone of the first beam delivery device is irradiated; and wherein the steps of switching between beam delivery devices continue for all products that are to be irradiated.

17. A system according to claim 15, wherein predetermined parts of the products are irradiated by the first beam delivery device and other parts are irradiated by the second beam delivery device.

18. A system according to claim 15, wherein said synchronization means includes an adjustable mechanical means that speeds up and slows down said containers containing said products.

* * * * *